US008307085B2

(12) United States Patent
Sinha et al.

(10) Patent No.: US 8,307,085 B2
(45) Date of Patent: Nov. 6, 2012

(54) STORING STATE OF DISTRIBUTED ARCHITECTURE IN EXTERNAL STORE

(75) Inventors: Rishi Rakesh Sinha, Bothell, WA (US); Lu Xun, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 12/724,422

(22) Filed: Mar. 16, 2010

(65) Prior Publication Data

US 2011/0231450 A1    Sep. 22, 2011

(51) Int. Cl.
  *G06F 15/16* (2006.01)
(52) U.S. Cl. ........................................ 709/225; 709/227
(58) Field of Classification Search .......... 709/200–203, 709/217–227, 228
  See application file for complete search history.

(56) References Cited

U.S. PATENT DOCUMENTS

| 6,438,705 | B1 * | 8/2002 | Chao et al. .................... 714/4.11 |
| 7,024,483 | B2 * | 4/2006 | Dinker et al. ................. 709/227 |
| 7,043,550 | B2 | 5/2006 | Knop et al. |
| 7,124,131 | B2 * | 10/2006 | Guthridge et al. ..................... 1/1 |
| 7,295,525 | B2 * | 11/2007 | Shapiro et al. ................ 370/256 |
| 7,447,917 | B2 | 11/2008 | Tan et al. |
| 7,447,940 | B2 * | 11/2008 | Peddada ......................... 714/11 |
| 7,624,194 | B2 | 11/2009 | Kakivaya et al. |
| 7,739,235 | B2 * | 6/2010 | Rousseau et al. ............. 707/610 |
| 7,957,301 | B2 * | 6/2011 | Bhatti et al. .................... 370/248 |
| 2005/0058085 | A1 * | 3/2005 | Shapiro et al. ................ 370/256 |
| 2006/0235889 | A1 * | 10/2006 | Rousseau et al. .......... 707/104.1 |
| 2008/0288645 | A1 | 11/2008 | Chang et al. |
| 2008/0288659 | A1 | 11/2008 | Hasha et al. |
| 2009/0006635 | A1 * | 1/2009 | Siegmund ..................... 709/228 |
| 2009/0077251 | A1 | 3/2009 | Brown et al. |
| 2009/0193288 | A1 | 7/2009 | Kakivaya et al. |
| 2009/0201844 | A1 * | 8/2009 | Bhatti et al. .................... 370/312 |
| 2011/0219072 | A1 * | 9/2011 | Yang et al. .................... 709/204 |

OTHER PUBLICATIONS

Cooper, et al., "A Randomized Algorithm for the Joining Protocol in Dynamic Distributed Networks", Institut National De Recherche En Informatique Et En Automatique, No. 5376, ISSN 0249-6339, Nov. 2004, Retrieved at <<http://hal.archives-ouvertes.fr/docs/00/07/06/27/PDF/RR-5376.pdf>>.

* cited by examiner

*Primary Examiner* — Moustafa M Meky

(57) ABSTRACT

Architecture that applies to a collection of nodes (e.g., a federation) and manages membership of the nodes to the collection via an external datastore. The storage of node state and collection state is stored in the external and highly available datastore. New nodes can now join the collection through the external store. The machines (nodes) in the collection create a lease with the external store that allows the external store to maintain precise knowledge of the set of machines alive in the collection. The external store thus allows the new machines to join the collection while ensuring that there exists only one ring in the collection. In other words, the disclosed architecture protocol ensures that any given point of time there is just one ring for the collection. Moreover, this can be in addition to a current join protocol, which ensures that consistent routing is available.

20 Claims, 9 Drawing Sheets

STORING STATE OF DISTRIBUTED ARCHITECTURE IN EXTERNAL STORE

BACKGROUND

Advances in computer technology and the general mobility of users and expansiveness of corporate enterprises have generally contributed to the increase in computer applications in various industries in order to provide more efficient and effective communications and data handling. Server systems are utilized in ways that improve the efficiency and reliability in not only making information available but also communicating information between servers.

A database is an organized collection of information with data structured such that a program can quickly search and select desired pieces of data, for example. In many deployments, the database is distributed across many machines for access and reliability. A federation can be described as a collection of nodes that are part of a distributed system, and where one node does not necessarily know about some or all the other nodes. In such a scenario, a problem can exist in the efficient and effective management of membership in the federation by joining new nodes and removing existing nodes, for example.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture applies to a collection of nodes (e.g., a federation) and manages membership of the nodes to the collection via an external datastore. The architecture facilitates the storage of node state and collection state in the external and highly available datastore. Rather than joining the collection through a distributed protocol, new machines can now join the collection through the external store. The external store at least provides get/put semantics with transaction consistency guarantees. In other words, any store that provides such capability can be used as the storage algorithm described herein.

The machines (nodes) in the collection create a lease with the external store that allows the external store to maintain precise knowledge of the set of machines alive in the collection. The external store thus allows the new machines to join the collection while ensuring that there exists only one ring in the collection. In other words, the disclosed architecture protocol ensures that any given point of time there is just one ring for the collection. Moreover, this can be in addition to a current join protocol, which ensures that consistent routing is available.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
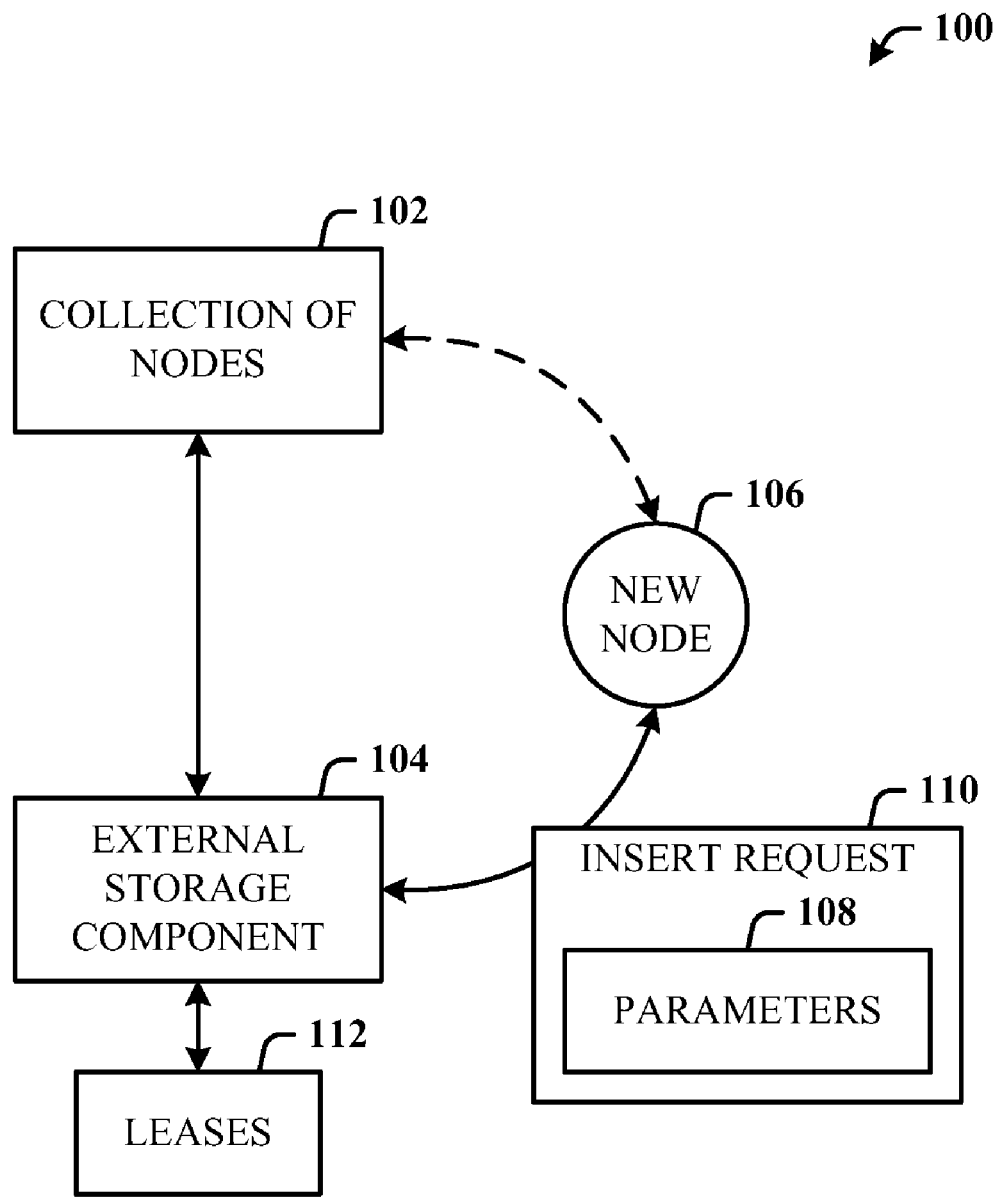
FIG. 1 illustrates a computer-implemented node management system in accordance with the disclosed architecture.

Existing federation collections utilize a quorum of seed nodes (entry points into the system) that are alive at all times for the federation to stay viable. Some federation applications cannot allow such restrictions on nodes being alive at all times and are willing to provide a highly available external store as an alternate point of access to the federation. The disclosed solution removes the requirement of a quorum of seed nodes being alive by alternatively employing a highly available external store.

The node collection can be are part of a federation, which represents a distributed collection of nodes, but where not every node knows about some or all of the other nodes. In general, the federation can include organizations that have established trust for shared access to a set of resources. At no time will any two nodes claim ownership of the same token, and a message destined to the nodes of a given identifier at any moment is accepted only by those nodes. In other words, the tokens can be identifiers such that messages are sent to specific identifiers of a predefined identifier space. The federation guarantees that at no time will a message sent to a particular identifier be received and processed by two or more different nodes.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented node management system 100 in accordance with the disclosed architecture. The system 100 includes a collection 102 of nodes. A ring is collection of nodes organized into a logical federation. A node joins the ring (collection) to send and/or receive messages to at least one other node of the ring, as well as broadcast to all nodes. A node that leaves the ring (e.g., due to failure or an intentional leave) is automatically known such that other nodes of the ring receive notification that the departed node is no longer part of the ring. The collection 102 of nodes has only one leader node at any point in time. The leader designation can change based on the message communications.

The nodes can leave and join the collection 102 to send and/or receive messages. The system 100 can also include an external storage component 104 that is highly available and transactionally consistent, and via which a new node 106 attempts to join the collection 102. In other words, a consistency guarantee is provided such that if a node leaves the collection 102 (e.g., kicked out), the other nodes of the collection 102 are notified of this departure such that messages are not routed to the departed node.

The external storage component 104 receives node parameters 108 from the new node 106 in an insert request 110. The external storage component 108 manages membership of the nodes to the collection and a new node that attempts to join the collection. The external storage component 108 is highly available and transactionally consistent. The external storage component 108 assigns a state to the new node based on membership status of other nodes. The external storage component 104 determines if the new node 106 will be joined into the collection 102 based on the parameters 108. The external storage component 104 can start a new collection (e.g., a ring) using the new node 106, join the new node 106 to the collection 102, or block the new node 106 from joining the collection 102 based on the parameters 108.

The new node 106 can attempt to join the collection 102 via the external storage component 104 rather than an alternative join mechanism provided in the system 100. For example, an alternative join mechanism can be joining through a seed node (the purpose of which is to provide a way into the collection 102) that already is a member of the collection 102.

The external storage component 104 maintains leases 112 with the nodes of the collection 102, and manages membership of the nodes in the collection 102 via the leases 112. Leases provide the ability to prevent multiple rings (collections). In other words, a node seeking to join the collection should only be allowed to join an existing collection or start new collection if no other collection exists (this is referred to as a "bootstrap" problem). Each node that joins the collection inserts its associated identifier in the external storage component 104. A lease includes a node identifier (id) and time-to-live (TTL), which is the time before the next renewal process for that node id. The leases 112 allow the external storage component 104 to determine which of the nodes is alive. The external storage component 104 also provides a way for a new node to determine if intended target node for communicating a message is still in the collection. Each node renews an associated lease (of the leases 112) maintained at the external storage component 104 according to the predetermined time interval, for example. If the new node determines from the storage component 104 that the target node is currently in the collection (as indicated by the TTL data), the new node will not be allowed to create a new collection (ring), but join, if allowed. On the other hand, if the lease information from the external storage component 104 indicates the target node lease has expired, the new node can create a new collection, if no other nodes exist in the current collection.

It can be the case with other criteria are employed to trigger lease renewal, such as importance of the node, activity of the node, message being sent to the nodes, and so on, as imposed in policies, for example. The external storage component 104 can drop a node from the collection 102 that fails to renew an associated lease (of the leases 112).

The external store (storage component 104) is the point of entry into the collection. Generally, the process for a new node (external) joining the collection (e.g., a ring) can be the following. The new node sends a join request (with parameters) to the external store. The external store responds to the new node with the current assigned state. The state can be routing, joining or blocked, for example. Routing means that no other routing nodes are present in the collection (here, a ring) and the new node is free to form a new ring. Joining means that there are other routing nodes in the collection that can be used as an entry point into the collection. The list of the routing nodes is also provided to the new node by the external store. Blocked means that there are nodes in the collection that are in the joining state, but no other nodes are in the routing state. In this case, the node waits for a predetermined period of time and then performs a retry to join the collection with node status as non-joining.

Upon receiving the request (and parameters) from new node, the external store checks if routing nodes currently exist in the collection. Based on this check, the new node state can be set to joining, blocked, or routing. The state is returned to the new node along with a list of routing nodes. Leases are maintained and renewed for each of the collection nodes.

If the external storage component 104 disconnects from the ring (e.g., due to an interruption in communications, due to a brief power interruption to the storage component, etc.), but comes back into communication with the ring 202 within a predetermined period of time (e.g., seconds), the ring 202 will survive. Since there may be at least one node alive (e.g., the node has not removed itself from the ring due to a failure in the associated lease being renewed), the ring 202 will survive. A more detailed description of the protocol is described below.

Figure 2:
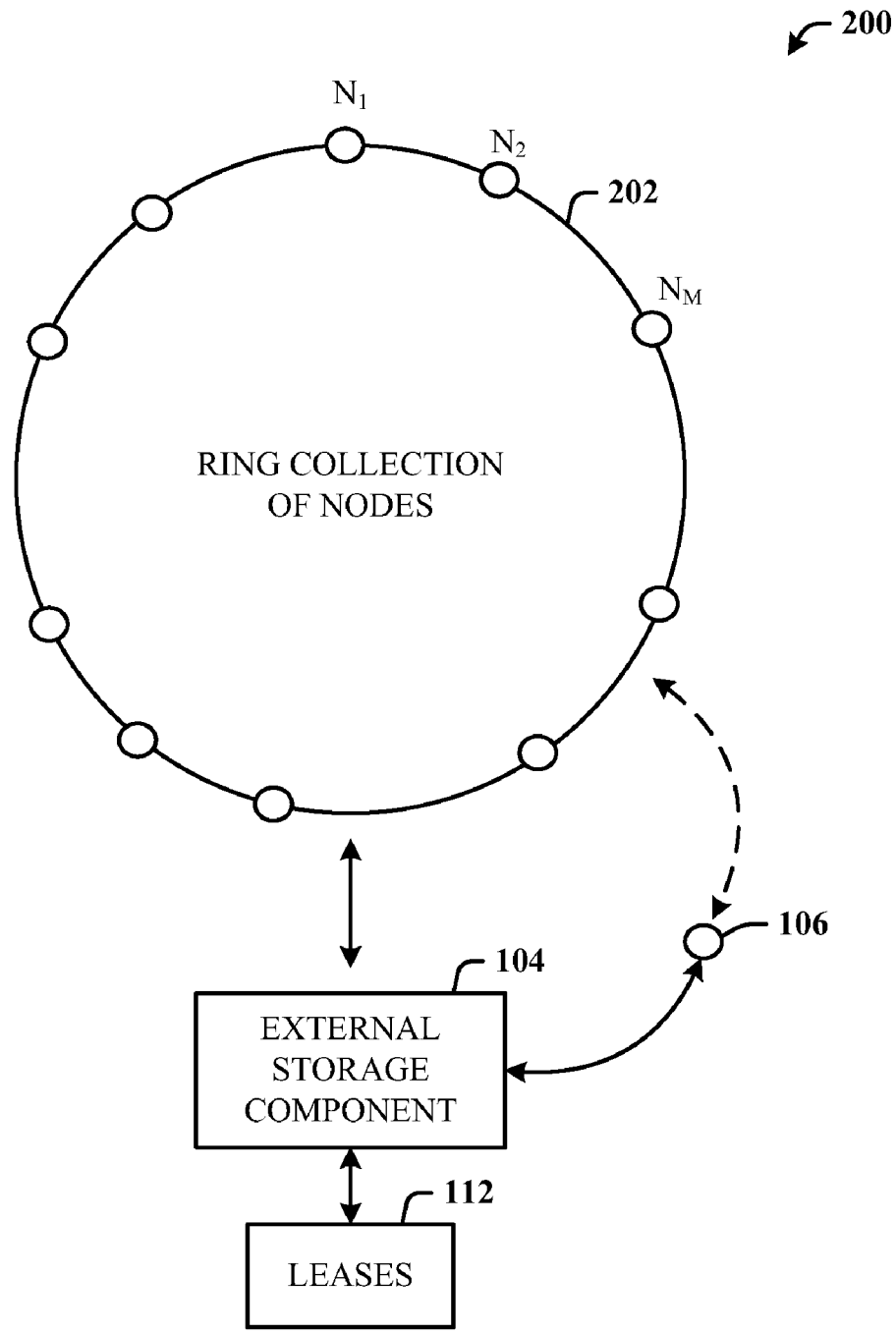
FIG. 2 illustrates a system where the collection of nodes is a ring.

FIG. 2 illustrates a system 200 where the collection of nodes is a ring 202. The nodes ($N_1, N_2, \ldots, N_M$) participating in the ring 202 are a sorted list using a binary relation that is reflexive, anti-symmetric, transitive, total, and defined over the domain of node identities. For example, both ends of the sorted list can be joined, thereby forming a circular topology (ring). This provides for each node in the list to view itself as being at the middle of the sorted list. Moreover, the list can be doubly linked such that a node can traverse the list in either direction. Still further, a one-to-one mapping function can be defined from the value domain of the node identities to the nodes. The set of nodes ($N_1, N_2, \ldots, N_M$) cooperate to form a dynamic and scalable network such that information can be systematically and efficiently disseminated and located.

The new node 106 attempts to join the ring 202 via the external storage component 104. The external storage component 104 receives node parameters from the new node 106 in the insert request, and the external storage component 104 determines if the new node 106 will be joined into the collection 102 based on the parameters. The external storage component 104 can start a new ring using the new node 106, join the new node 106 to the ring 202, or block the new node 106 from joining the ring 202 based on the parameters. Note that ring 202 is constrained by the external storage component and associated protocol to be a single ring of the nodes (new node and other nodes).

The external store (storage component 104) is the point of entry into the ring 202. Generally, the process for the new node (external) joining the ring 202 is similar to that described for the new node 106 joining the collection 102 of FIG. 1.

As with the system 100 of FIG. 1, the external storage component 104 maintains leases 112 with the nodes of the ring 202, and manages membership of the nodes in the ring 202 via the leases 112. The leases 112 allow the external storage component 104 to determine which of the nodes is alive. Each node renews an associated lease (of the leases 112) maintained at the external storage component 104 according to a predetermined time interval, for example. It can be the case with other criteria are employed to trigger lease renewal, such as importance of the node, activity of the node, message being sent to the nodes, and so on, as imposed in policies, for example. The external storage component 104 can drop a node from the ring 202 that fails to renew an associated lease (of the leases 112).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
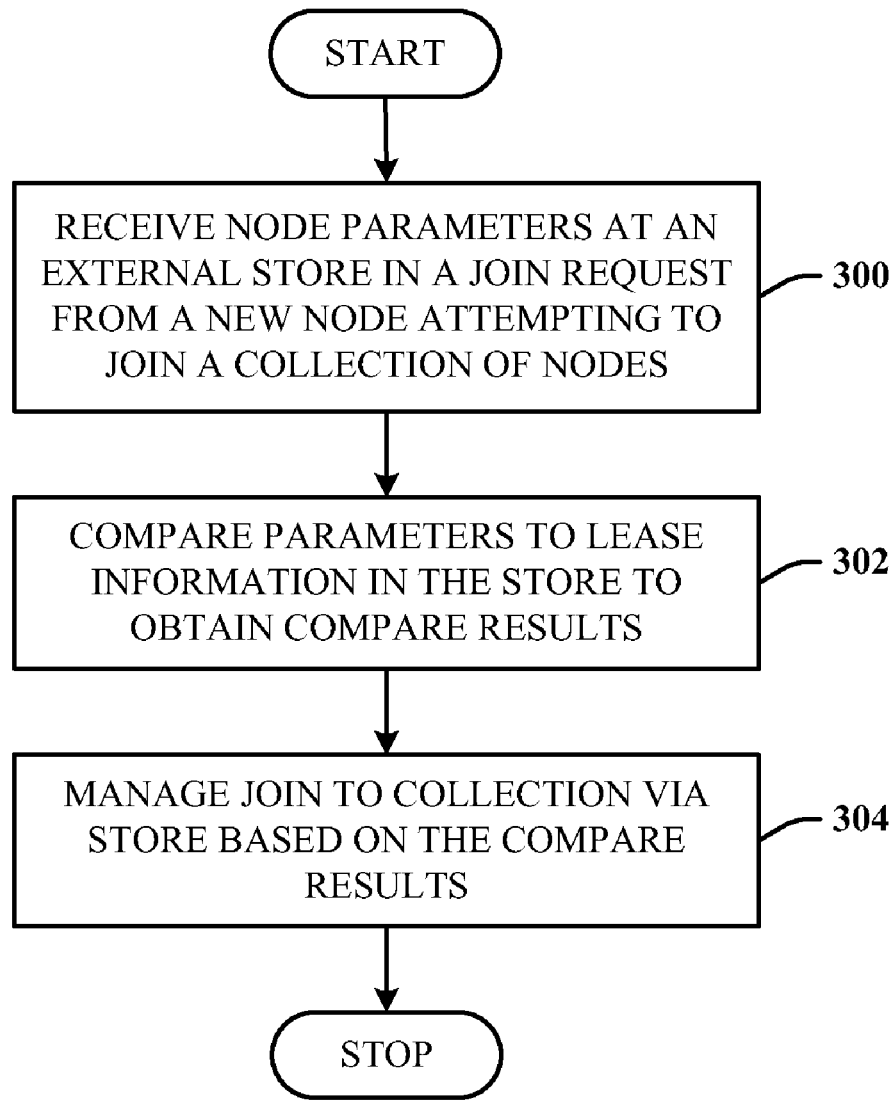
FIG. 3 illustrates a computer-implemented node join method in accordance with the disclosed architecture.

FIG. 3 illustrates a computer-implemented node join method in accordance with the disclosed architecture. At 300, node parameters are received at an external store in a join request from a new node attempting to join a collection of nodes. At 302, the parameters are compared to lease information in the store to obtain compare results. At 304, join to the collection is managed via the store based on the compare results.

Figure 4:
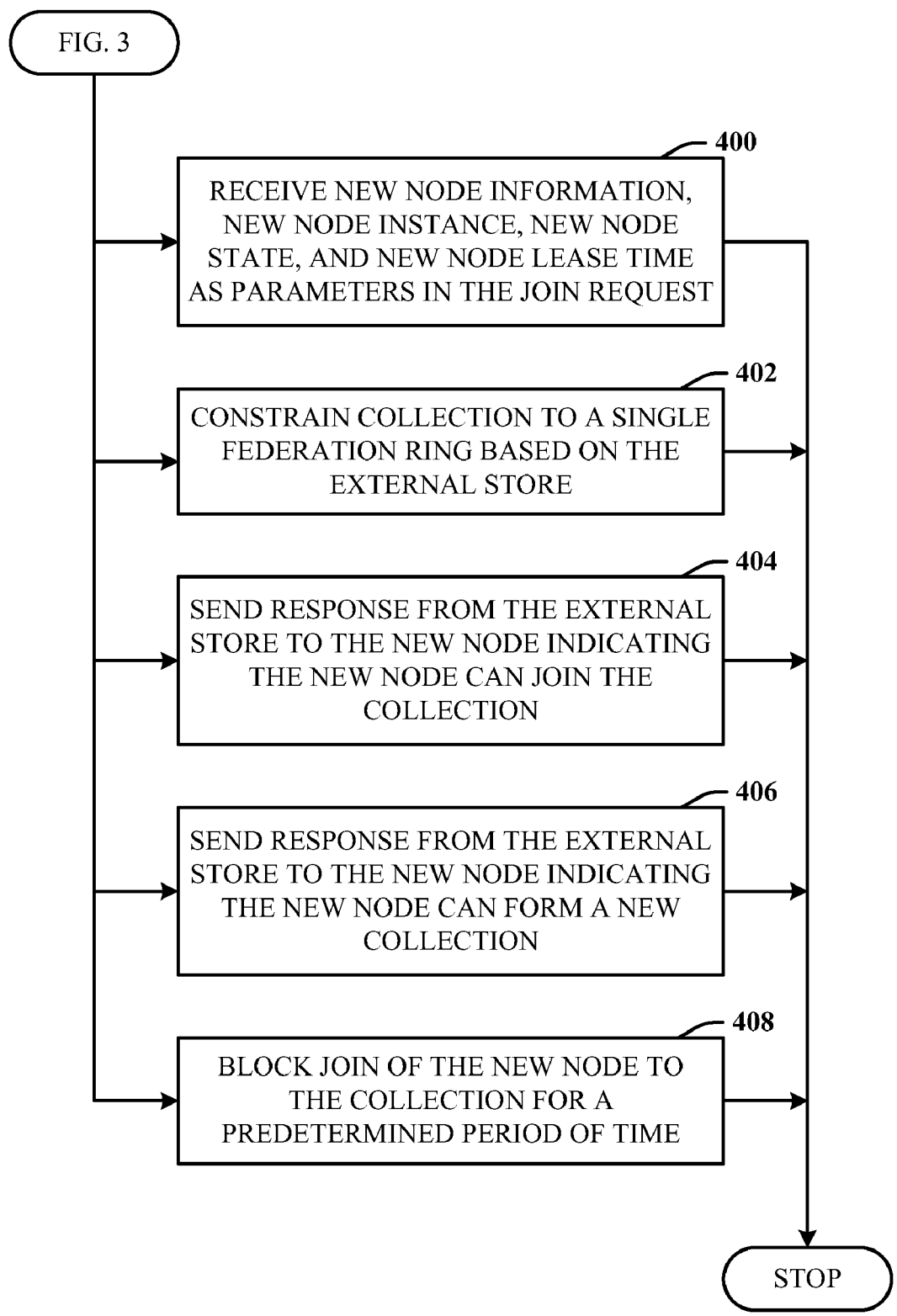
FIG. 4 illustrates additional aspects of the method of FIG. 3.

FIG. 4 illustrates additional aspects of the method of FIG. 3. At 400, new node information, new node instance, new node state, and new node lease time is received as parameters in the join request. At 402, the collection is constrained to a single federation ring based on the external store. At 404, a response is sent from the external store to the new node indicating the new node can join the collection. At 406, a response is sent from the external store to the new node indicating the new node can form a new collection. At 408, join of the new node to the collection is blocked for a predetermined period of time.

Figure 5:
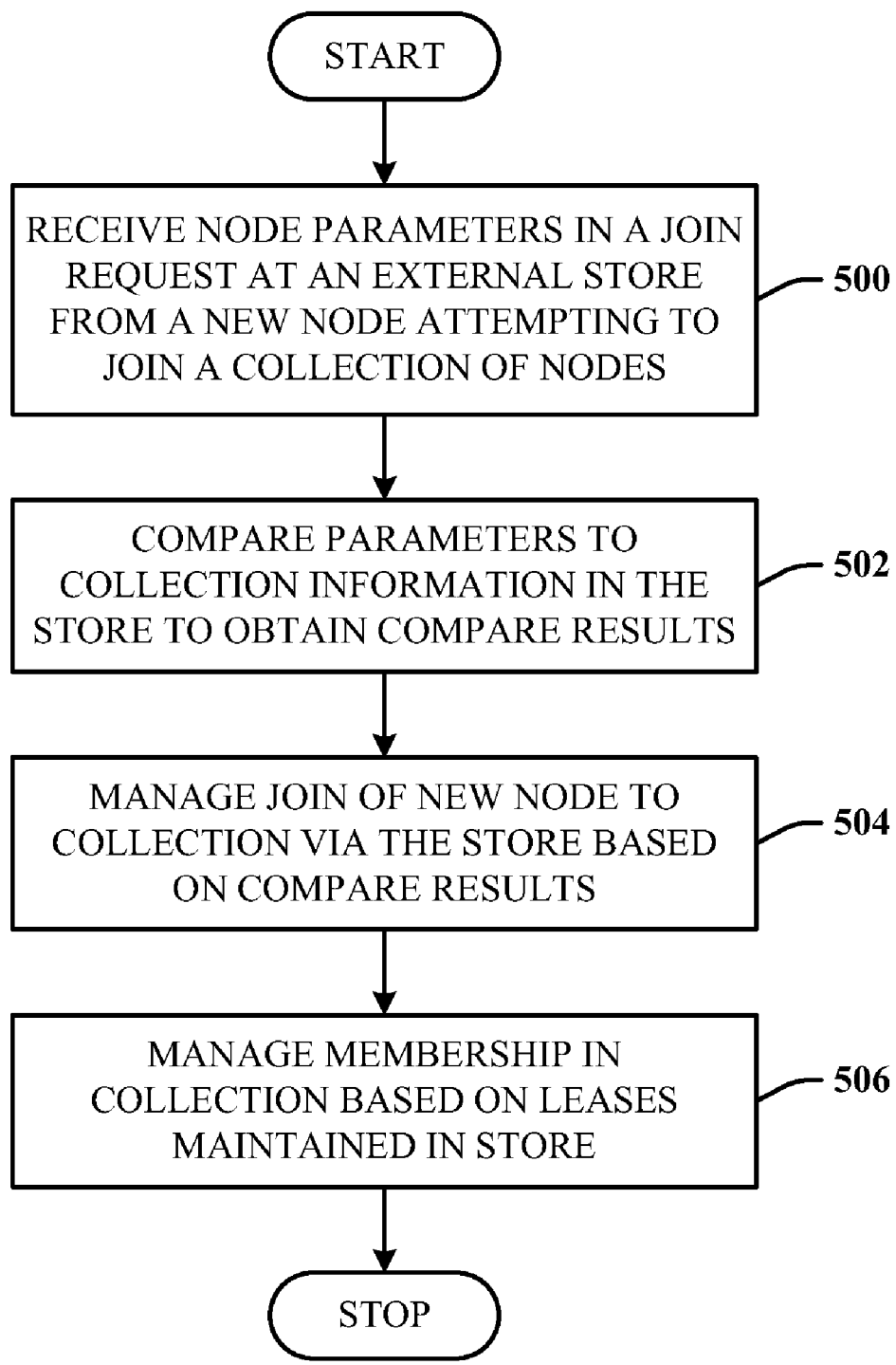
FIG. 5 illustrates is an alternative node join method.

FIG. 5 illustrates is an alternative node join method. At 500, node parameters are received in a join request at an external store from a new node attempting to join a collection of nodes. At 502, the parameters are compared to collection information in the store to obtain compare results. At 504, join of the new node to the collection is managed via the store based on the compare results. At 506, membership in the collection is managed based on leases maintained in the store.

Figure 6:
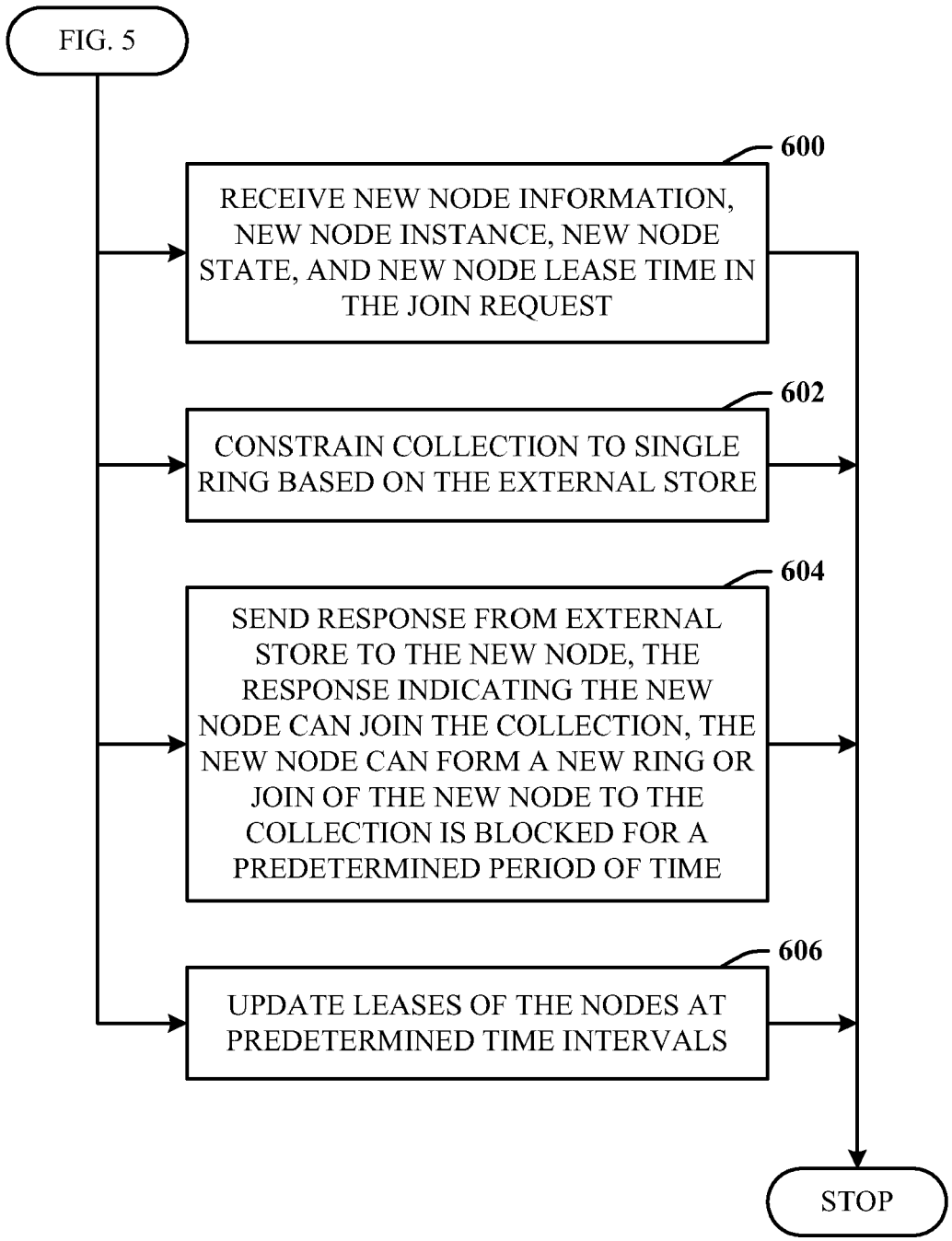
FIG. 6 illustrates additional aspects of the method of FIG. 5.

FIG. 6 illustrates additional aspects of the method of FIG. 5. At 600, new node information, new node instance, new node state, and new node lease time is received in the join request. At 602, the collection is constrained to a single ring based on the external store. At 604, a response is sent from the external store to the new node, the response indicating the new node can join the collection, the new node can form a new ring or join of the new node to the collection is blocked for a predetermined period of time. At 606, the leases of the nodes are updated at predetermined time intervals.

Figure 7:
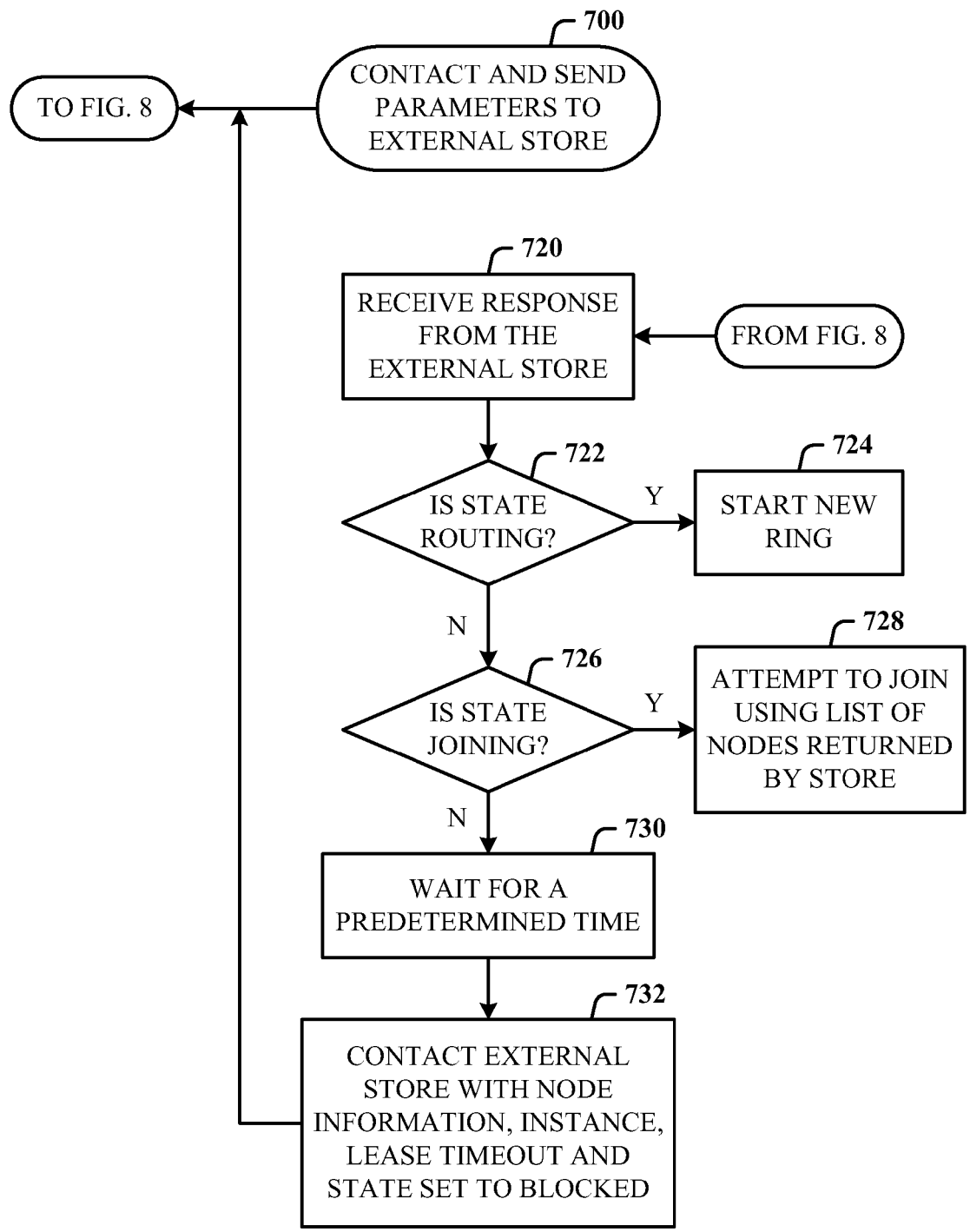
FIG. 7 illustrates a method of joining a federation from a perspective of the external node.
Figure 8:
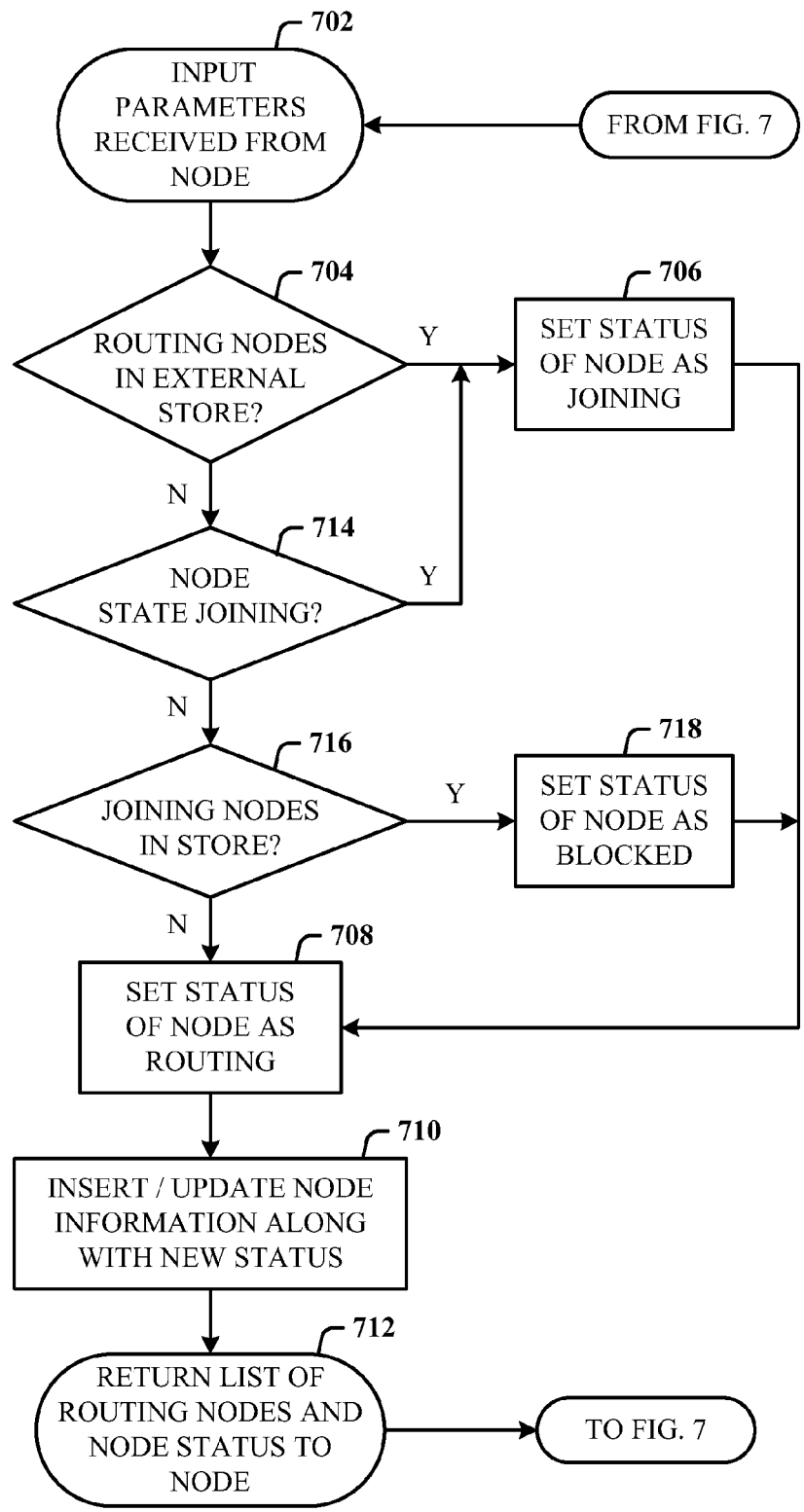
FIG. 8 illustrates a method of processing a node join from a perspective of the external datastore.

FIGS. 7 and 8 illustrate a comprehensive flow chart of a protocol for managing membership in a node collection using an external store. FIG. 7 illustrates a method of joining a federation from a perspective of the external node. At 700, the external node contacts and sends input parameters to the external store. The parameters can include node information, node instance, lease timeout data, and node state (set to joining) Flow is to FIG. 8, which continues the flow of FIG. 7, and illustrates a method of processing a node join from a perspective of the external datastore. At 702, the external store receives the parameters from the node. At 704, a check is made for routing nodes at the external store. If routing nodes are available, flow is to 706 to set the node status a joining Flow is then to 708 to set the status of the node as joining. At 710, the node information is inserted/updated as well as the node status. At 712, a list of routing nodes and the node status is returned to the node.

Returning to 704, if there are no routing nodes in the external store, flow is to 714, to check if the node state is joining If so, flow is back to 706. If the node state is not joining, as checked at 714, flow is to 716 to check for joining nodes in the external store. If there are joining nodes, flow is to 718 to set the node status as blocked. Flow is to 708. If there are no joining nodes in the external store, flow is from 716 to 708. At 712, as previously indicated, the list of routing nodes and the node status is returned in a response to the node.

Returning to FIG. 7, flow is from 712 to 720, where the node receives the response from the external store. At 722, a check is made of state returned in the response. If state is routing, flow is to 724 to start a new ring. If state is not routing, flow is from 722 to 726 to check if state is joining If so, flow is to 728, to attempt to join using the list of nodes returned by the external store. If the state is not joining, flow is from 726 to 730, to wait for a predetermined period of time. At 732, the node then contacts the external store again, at 702, of FIG. 8, sending parameters that include node information, node instance, lease timeout, and node state set to blocked.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
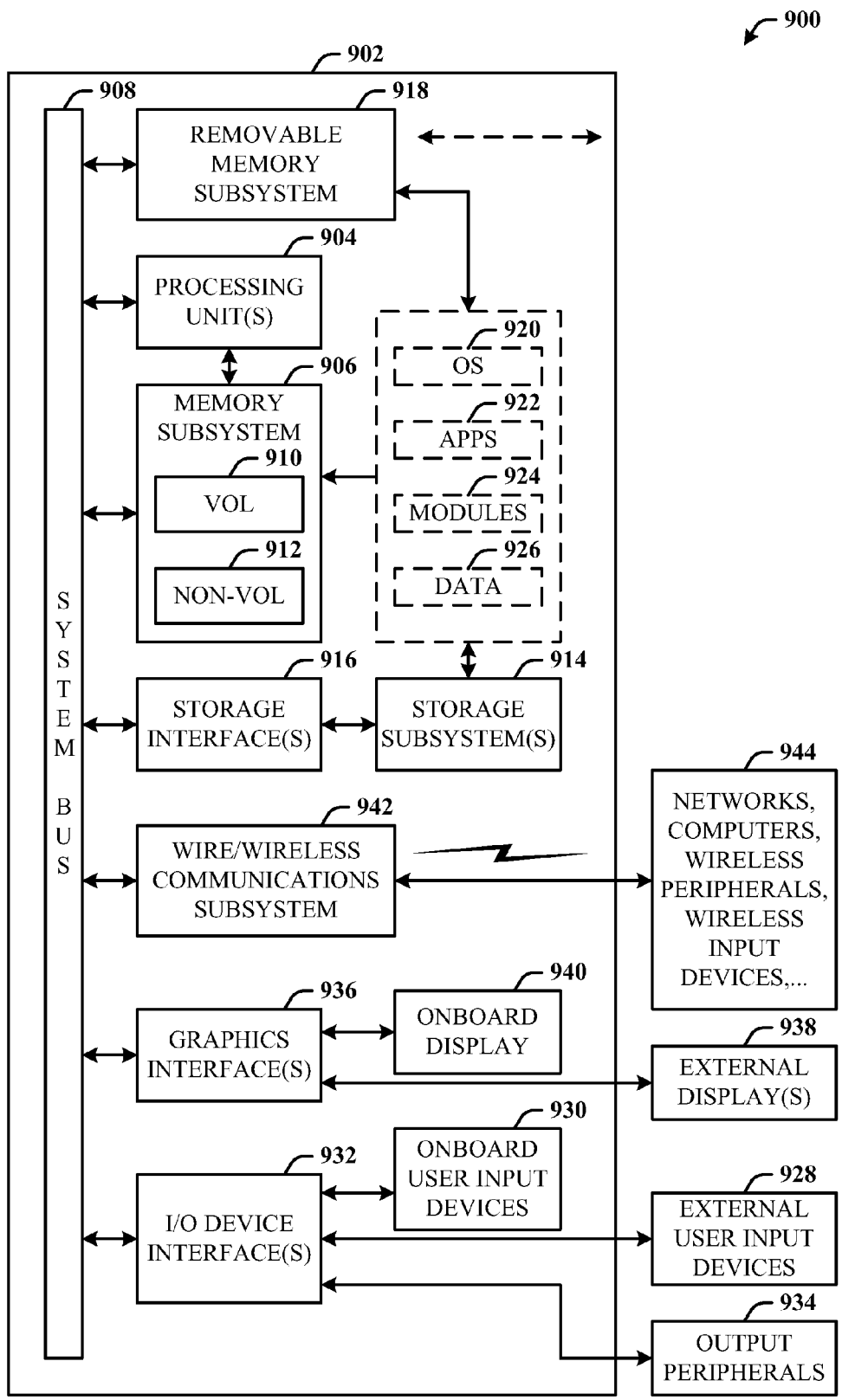
FIG. 9 illustrates a block diagram of a computing system employed to process join to a collection of nodes via external storage in accordance with the disclosed architecture.

Referring now to FIG. 9, there is illustrated a block diagram of a computing system 900 employed to process join to a collection of nodes via external storage in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can includes the entities and components of the system 100 of FIG. 1, the entities and components of the system 200 of FIG. 2, and the methods represented by the flow charts of FIGS. 3-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. The storage subsystem(s) 914 and memory subsystems (906 and 918) serve as computer readable media for volatile and non-volatile storage of data, data structures, computer-executable instructions, and so forth. The instructions can exist on non-transitory media. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented federation system, comprising:
    a collection of nodes, one or more of the nodes leave the collection and new nodes attempt to join the collection to communicate messages with one or more other nodes of the collection;
    an external storage component that manages membership of the nodes to the collection and a new node that attempts to join the collection, the external storage component assigns a state to the new node based on membership status of other nodes; and
    a microprocessor that executes instructions stored in a memory.

2. The system of claim 1, wherein the external storage component receives parameters from the new node in a request to join the collection and the external storage component determines if the new node is joined into the collection based on the parameters.

3. The system of claim 2, wherein the external storage component applies state to the new node that starts a new collection using the new node, joins the new node to the collection, or blocks the new node from joining the collection based on the parameters.

4. The system of claim 1, wherein the new node attempts to join the collection via the external storage component rather than an alternative join mechanism.

5. The system of claim 1, wherein the external storage component manages membership of the nodes in the collection according to leases established between the external storage component and each of the nodes, the leases allow the external storage component to determine which of the nodes is a member of the collection.

6. The system of claim 1, wherein a node removes itself from the collection if an associated lease is not renewed by the external storage component.

7. The system of claim 1, wherein each node renews an associated lease maintained at the external storage component according to a predetermined time interval.

8. The system of claim 1, wherein the external storage component drops a node from the collection that fails to renew an associated lease, as managed by the external storage component.

9. The system of claim 1, wherein the collection is constrained as a single ring of the nodes.

10. A computer-implemented node management method, comprising acts of:
    receiving node parameters at an external store that allows access to a collection of nodes based on a join request from a new node attempting to join the collection of nodes;
    comparing the parameters to lease information in the store to obtain compare results;
    managing joining of the new node to the collection via the store based on the compare results; and
    utilizing a micoprocessor that executes instructions stored in memory.

11. The method of claim 10, further comprising receiving new node information, new node instance, new node state, and new node lease time as parameters in the join request.

12. The method of claim 10, further comprising constraining the collection to a single federation ring based on the external store.

13. The method of claim 10, further comprising sending a response from the external store to the new node indicating the new node can join the collection.

14. The method of claim 10, further comprising sending a response from the external store to the new node indicating the new node can form a new collection.

15. The method of claim 10, further comprising blocking join of the new node to the collection for a predetermined period of time.

16. A computer-implemented node management method, comprising:
    receiving node parameters in a join request at an external store from a new node attempting to join a collection of nodes in which the external store is a single point of entry into the collection of nodes;
    comparing the parameters to collection information in the external store to obtain compare results;
    managing joining of the new node to the collection via the external store based on the compare results; managing membership in the collection based on leases maintained in the store; and
    utilizing a microprocessor that executes instructions stored in memory.

17. The method of claim 16, further comprising receiving new node information, new node instance, new node state, and new node lease time in the join request.

18. The method of claim 16, further comprising constraining the collection to a single ring based on the external store.

19. The method of claim 16, further comprising sending a response from the external store to the new node, the response indicating the new node can join the collection, the new node can form a new ring or join of the new node to the collection is blocked for a predetermined period of time.

20. The method of claim 16, further comprising updating the leases of the nodes at predetermined time intervals.

* * * * *